United States Patent [19]

Standal

[11] 4,192,335
[45] Mar. 11, 1980

[54] GUIDANCE SYSTEM FOR IRRIGATION SPRINKLING APPARATUS

[76] Inventor: Norman S. Standal, Star Route, Bliss, Id. 83314

[21] Appl. No.: 897,637

[22] Filed: Apr. 18, 1978

[51] Int. Cl.² ............................................. B05B 3/18
[52] U.S. Cl. ....................................... 137/1; 137/344; 239/183; 239/212
[58] Field of Search .................... 137/1, 344; 239/183, 239/212

[56] References Cited

U.S. PATENT DOCUMENTS

| | | | |
|---|---|---|---|
| 3,085,646 | 4/1963 | Paufve | 180/98 |
| 3,255,968 | 6/1966 | Stafford | 239/212 |
| 3,444,941 | 5/1969 | Purtell | 137/344 X |
| 3,463,175 | 8/1969 | Rogers | 137/1 |
| 3,575,200 | 4/1971 | Imeson | 137/344 |
| 3,583,428 | 6/1971 | Cornelius | 137/344 |
| 3,590,869 | 7/1971 | Von Linsowe | 137/344 X |
| 3,608,827 | 9/1971 | Kinkead | 137/344 X |
| 3,613,703 | 10/1971 | Stout | 137/1 |
| 3,707,164 | 12/1972 | Clemons | 137/344 |
| 3,710,818 | 1/1973 | Imeson | 137/344 |
| 3,726,478 | 4/1973 | McMurray | 137/344 X |
| 3,729,016 | 4/1973 | Von Linsowe | 137/344 |
| 3,811,617 | 5/1974 | Cornelius | 137/212 X |
| 3,970,102 | 7/1976 | Harvey | 137/344 |
| 3,984,052 | 10/1976 | Di Palma | 137/344 X |
| 4,069,888 | 1/1978 | Wolters et al. | 180/98 |

Primary Examiner—Gerald A. Michalsky
Attorney, Agent, or Firm—Wells, St. John & Roberts

[57] ABSTRACT

A sprinkling apparatus powered for movement along a row of spaced risers. It is guided along a path parallel to the risers without any physical guidance being provided in the spaces between them. A coupler engages each successive riser and selectively completes a hydraulic circuit between the riser and the sprinkling apparatus. Mechanical indexing and engagement of the coupler relative to the riser is used as a guide for modifying the direction of movement of the sprinkling apparatus in order to permit engagement of the next successive riser by the coupler. All functions of the sprinkling apparatus are automatically sequenced upon engagement of selected risers. Alternate risers can be skipped. Reversal of the sprinkling apparatus can be achieved by placement of stop mechanisms along the row of risers.

18 Claims, 20 Drawing Figures

Fig. 20

GUIDANCE SYSTEM FOR IRRIGATION SPRINKLING APPARATUS

BACKGROUND OF THE INVENTION

This invention relates to an apparatus for sequentially and automatically operating a mobile apparatus such as a powered sprinkling apparatus. The details of the sprinkling apparatus itself are well known. Many types of devices are currently in use, including powered carriages having a single large sprinkling nozzle and elongated sprinkling conduits having a plurality of sprinklers arranged along their lengths. For instance, the present apparatus could be used in combination with the elongated conduits and associated sprinkling devices currently used in center pivot irrigation, where jointed lengths of conduit are arranged in line and are suspended above a field by independently powered carriages. Rather than limiting such sprinkling equipment to use about a fixed center pivot, the present apparatus frees them for travel along a field in a path parallel to a series of stationary supply risers. This permits the sprinkling conduit to apply water to much larger areas than that surrounding a single center pivot. It also permits one to apply the water in a rectangular or irregularly shaped field pattern, eliminating the problems of circular movement and the inefficiency of sprinkling only a circular pattern within a square or rectangular field area.

DESCRIPTION OF THE PREFERRED EMBODIMENT

The present method relates to guidance of a mobile apparatus, which can comprise any type of vehicle. The mobile apparatus is adapted to be moved along the desired path of travel defined by a plurality of references spaced along the path. The method involves the step of sensing the minimum distance between a selected location on the mobile apparatus and each reference as the apparatus moves along the path. It further involves the step of steering the apparatus in response to the sensed distance to make any correction necessary to guide the apparatus onto the desired path of travel at the succeeding reference without any guidance between references. The steering of the apparatus is preset at each reference, whether the apparatus is moved intermittently between references, or continuously.

When applied to a steerable mobile sprinkling apparatus as described herein, the references are preferably water outlets arranged along a main water supply line. A mobile sprinkling apparatus is powered along the path. A coupling element is transversely centered with respect to each water outlet encountered by the sprinkling apparatus. The amount of movement necessary to center the coupling element is sensed. Finally, the steering mechanism of the sprinkling apparatus is modified in relation to such transverse movement to thereby direct the sprinkling apparatus to the subsequent water outlet without any guidance between the water outlets themselves.

The present apparatus is used in connection with a mobile apparatus such as a steerable wheel-supported sprinkling equipment, whether steered by pivoting of selected wheels or by varying the speed of selected driven wheels. A typical sprinkling apparatus is indicated generally in FIG. 1 by the reference numeral 10. This apparatus includes an elongated lateral conduit 11, which is normally a series of rigid sections, conduits or pipe joined by sealed movable joints. Each section of the conduit 11 is supported by a wheeled tower independently powered to move conduit 11 in a direction perpendicular to the length of conduit 11. In the illustrated example, the inner carriage 12 is located adjacent a main water supply line 16. Intermediate carriages 13 support the conduit along its length, and an outer carriage 14 is located furthermost from the main water supply line 16.

Water is supplied to the sprinkling apparatus 10 from a row of water outlets in the form of upright risers 15 which are shown attached to an underground main water supply line 16. The risers 15, which contain supply valves for control of water delivery, also constitute fixed guides for controlling steering and movement of the sprinkling apparatus 10. No steering guidance is utilized by the equipment intermediate the individual risers 15. However, the present apparatus is also applicable to risers 15 mounted to an above-ground water supply system, as well as the buried system illustrated.

Figure 5:
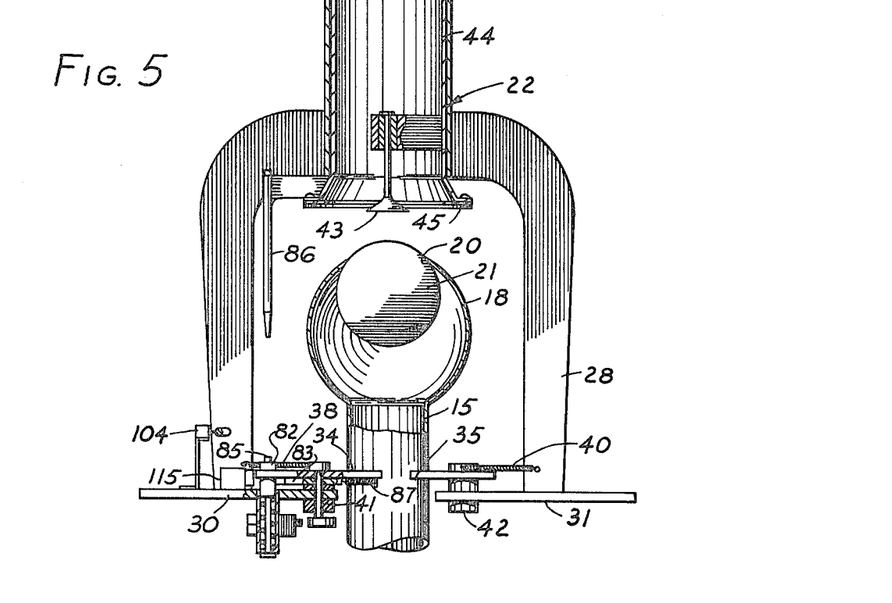
FIG. 5 is an enlarged sectional view taken along line 5—5 in FIG. 3.
Figure 6:
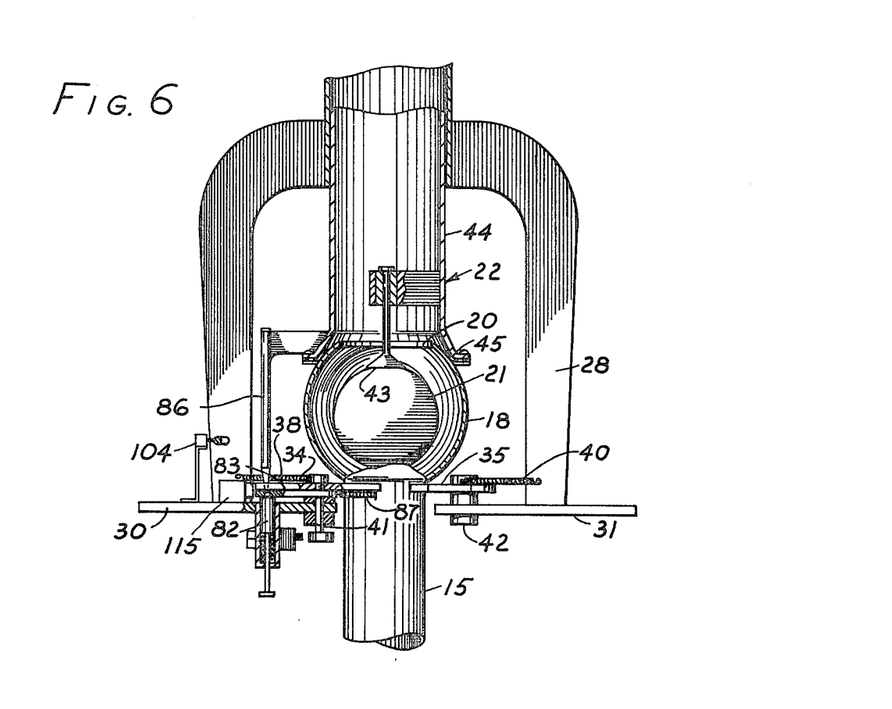
FIG. 6 is a view similar to FIG. 5 only showing different operational positions of the elements therein.

While not limited to a particular type of water outlet, riser or valve, the present arrangement is particularly useful in combination with a simple mechanically-actuated check valve used to control flow from each riser 15. The details of such a valve are best seen in FIGS. 5 and 6. Each valve comprises an enlarged spherical end 18 at the top of riser 15, which is cylindrical in cross section. The spherical upper end 18 includes a circular top aperture 20 through which water is discharged. A spherical ball 21 is located within the end 18. It is preferably made of material capable of floating in water. The buoyancy of ball 21 thereby biases it to the upper or closed position shown in FIG. 5. However, ball 21 is axially movable within the spherical upper end 18 to a lower position (FIG. 6) where aperture 20 is opened to permit flow of water from within the supply line 16 and riser 15. The diameter of ball 21 is greater than the interior diameter of riser 15 or the diameter of aperture 20, so that it cannot be accidentally displaced from within the spherical upper end 18 of riser 15.

A coupler assembly 22 selectively completes a hydraulic connection for flow of water from a selected valve on a riser 15 to the lateral conduit 11. This hydraulic communication is completed through a structural fluid connection assembly which includes an upright supply conduit 23 and a transverse supply conduit 24. The transverse supply conduit 24 is supported from the inner end of lateral conduit 11 by a pivotal knuckle 25 having suitable water seals and permitting movement of conduit 24 about a horizontal axis perpendicular to the length of lateral conduit 11. A lower stop 27, comprising abutting elements fixed respectively to the adjacent ends of conduit 11 and 24, limits downward pivotal movement of the length of conduit 24 with respect to lateral conduit 11. This governs the lowermost elevational position of coupler assembly 22 relative to the elevation of lateral conduit 11. In turn, it presets the elevation of coupler assembly 22 with respect to the risers 15, assuming that the field surface 17 between the row of risers 15 and the inner tower 12 is substantially horizontal.

Figure 1:
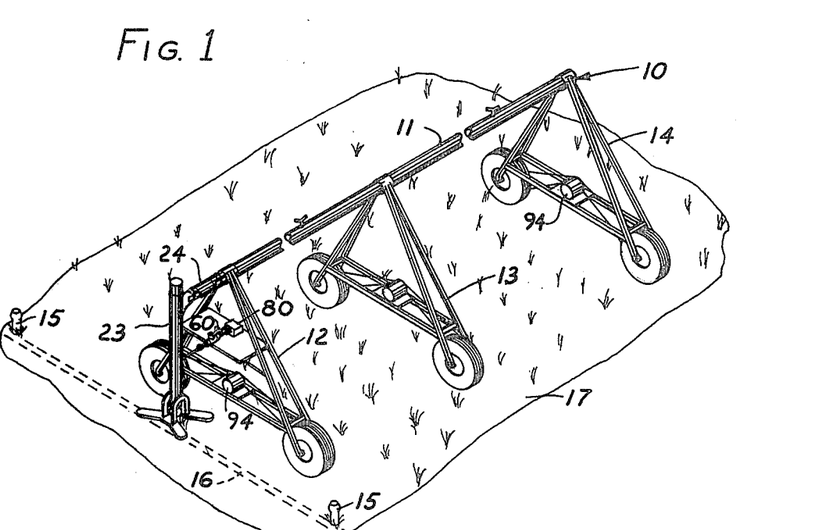
FIG. 1 is a fragmentary pictorial view of the present apparatus in operation in a field.
Figure 2:
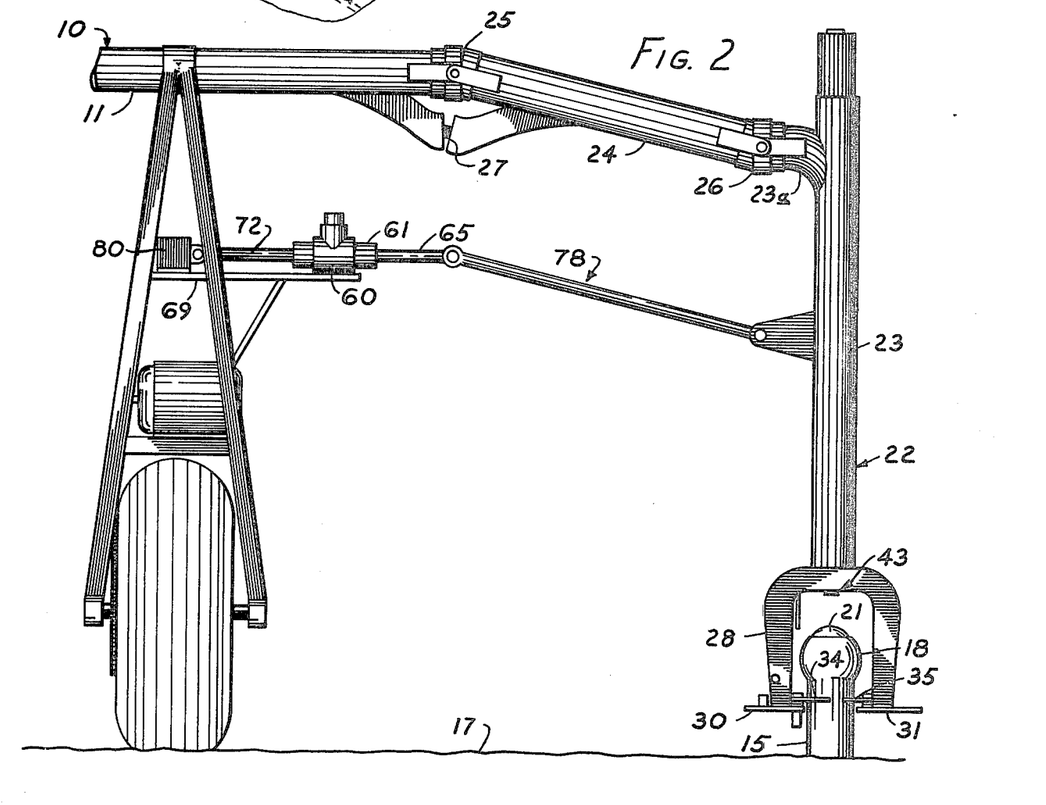
FIG. 2 is an enlarged elevational view of the present coupler assembly and associated elements.
Figure 3:
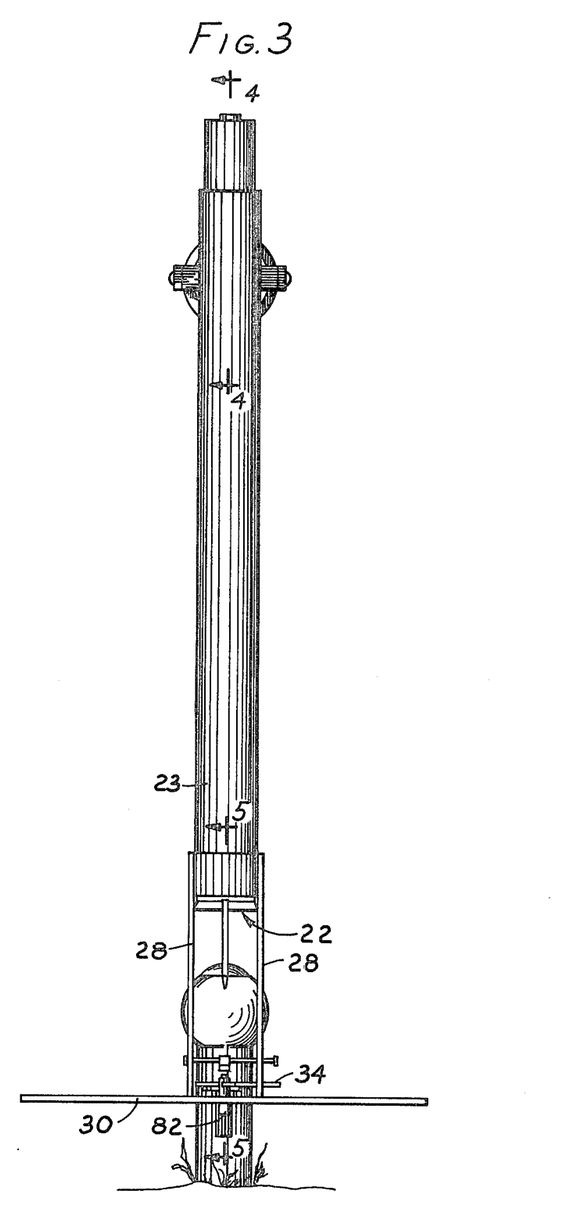
FIG. 3 is an enlarged end view of the coupler assembly.

A second pivotable knuckle 26 connects the remaining end of transverse supply conduit 24 to an elbow 23a in hydraulic communication with the upright supply conduit 23. The pivotal axis of knuckle 26 is parallel to the axis of knuckle 25. The transverse supply conduit 24 therefore freely supports the upright supply conduit 23 for movement. The weight of the depending conduit and coupler assembly 22 maintains conduit 23 in a normal substantially vertical position as shown in FIGS. 1 and 2. However, the coupler assembly 22 is free to pivot about the axes of knuckles 25, 26 as necessary to reposition it to provide proper indexing as coupler assembly 22 engages each riser 15.

Each coupler assembly 22 includes a pair of arched frames 28 fixed to the lower end of upright supply conduit 23. Frames 28 are spread transversely to provide sufficient clearance for reception of each riser 15. A pair of horizontal guide plates 30, 31 are fixed across the lower ends of the arched frames 28. They include converging upright edge surfaces 32, 33 which act as a guide means engageable with each riser 15 encountered by them. The surfaces 32, 33 center the coupler assembly 22 with respect to each riser 15 by moving the coupler 22 about the axes of knuckles 25, 26 in a direction transverse to the path of the sprinkling apparatus 10.

Figure 7:
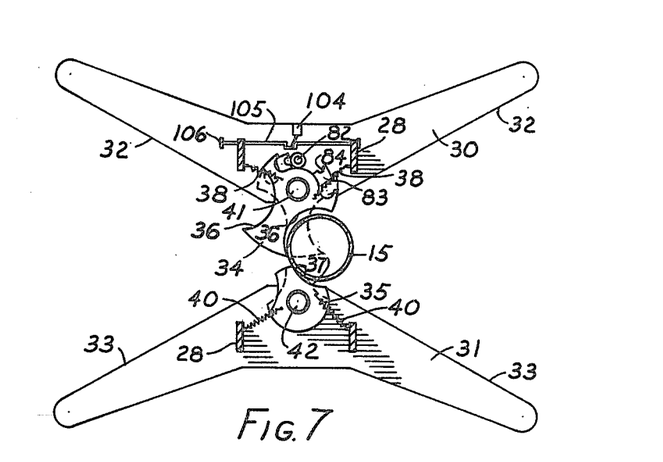
FIGS. 7-9 are sectional diagrammatic plan views illustrating positioning of riser sensing and locking mechanisms associated with my invention.

Mounted respectively at the upper surface of each guide plate 30, 31 are riser sensing and locking cams 34, 35. They are fixed to pivot posts 41, 42 which are journalled through the respective guide plates 30, 31 by conventional bearings. Cams 34, 35 are pivoted about parallel axes spaced transversely from one another. The cams 34, 35 are normally centered in opposition to one another across plates 30, 31 by tension springs 38, 40 extending between the respective cams 34, 35 and the upper surfaces of guide posts 30, 31. The springs 38, 40 normally maintain the cams 34, 35 in the position shown in dashed lines in FIG. 7. However, the cams 34, 35 are freely pivotable, when engaged against a riser 15, to the angular positions shown in FIG. 8, where complementary arcuate surfaces 36, 37 on the cams encircle the cylindrical upright wall of a riser 15. In this manner, the coupler assembly 22 is accurately aligned or indexed along the center upright axis of each riser 15 in preparation for actuation of the valve at its upper end.

Figure 4:
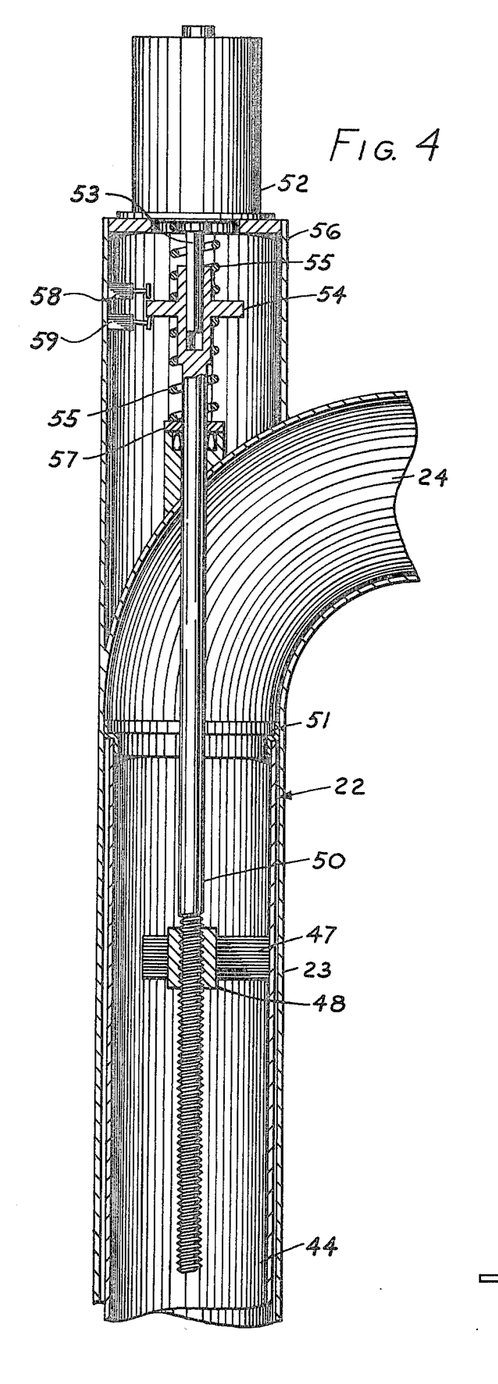
FIG. 4 is an enlarged sectional view taken along line 4—4 in FIG. 3.

The valve opener details are best seen in FIGS. 4, 5 and 6. The valve opener comprises a projection 43 fixed to the lower end of a movable length of conduit 44 slidably received and guided within the lower interior portions of the upright supply conduit 23. There is a watertight seal between the movable conduit 44 and supply conduit 23, and the two should be preferably keyed to one another to prevent rotation of conduit 44 relative to conduit 23. The lower end of movable conduit 44 includes a flexible peripheral seal 45 formed about a slightly enlarged flange. Seal 45 is adapted to fit tightly about the outer surface of the spherical upper end 18 of riser 15 while surrounding its top aperture 20 (FIG. 6). The relaive elevations of the projection 43 and seal 45 are such that a watertight seal will be established between the spherical upper end 18 of a riser 15 prior to movement of ball 21 due to continued downward movement of the projection 43.

The movable conduit 44 is shifted in a vertical direction by means of a motor 52 mounted to the upper end 56 of the upright supply conduit 23. Motor 52 powers a threaded shaft 50 threadably engaged within a complementary bearing 48 mounted to an upper spider 47 fixed within the upper end of conduit 44. The upper limit of movement of the conduit 44 relative to supply conduit 23 is defined by a circular flange 51 fixed about the inner surface of supply conduit 23 (FIG. 4).

The driving connection between motor 52 and threaded shaft 50 includes an overtravel mechanism best illustrated in FIG. 4. As shown, an annular flange 54 projects about an enlarged upper end of shaft 50, which slidably receives a complementary drive shaft 53 driven from motor 52. The exterior configuration of drive shaft 53 is non-rotatably received within the open central aperture formed through the enlarged upper end of shaft 50. For instance, drive shaft 53 and the aperture that slidably receives it might have complementary square cross-sectional configurations. Shafts 50, 53 are therefore capable of axial movement with respect to one another but not rotational movement. Flange 54 is biased to a central position by opposed springs 55 which respectively bear against flange 54 between the upper end 56 of conduit 23 and a bearing 57 at the junction of conduit 23 and elbow 23a respectively. The connection between drive shaft 53 and shaft 50 therefore permits overtravel of shaft 50 by continued rotation after axial movement of the conduit 44 is terminated by either engagement of the spherical upper end 18 of a riser 15, or by engagement of the flange 51. This overtravel is detected by a pair of opposed control switches 58, 59 which are respectively operated by flange 54 at the upper and lower limits of travel of movable conduit 44.

Figure 10:
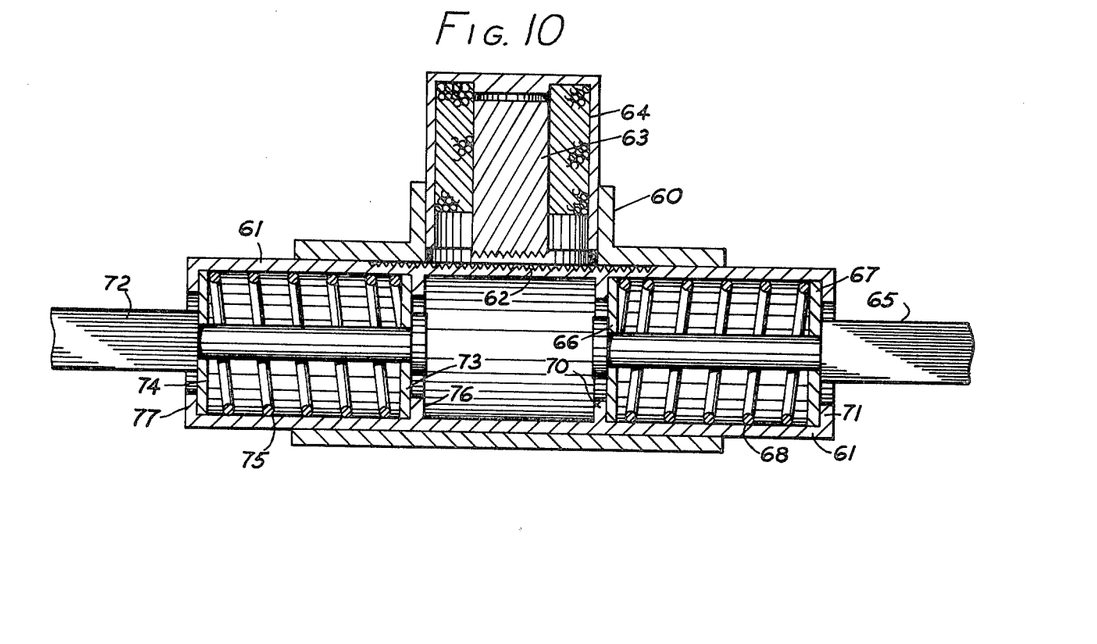
FIG. 10 is a sectional view of a control transfer mechanism.

Steering modification of the motors that drive the sprinkling apparatus 10 is accomplished through a sensing mechanism responsive to lateral movement of the coupler assembly 22 as it is indexed and centered with respect to each riser 15 at the closest position of each reference or riser with respect to the mobile apparatus. Transverse pivotal movement of the coupler assembly 22 and conduit 23, which moves in unison with it, is sensed by a control transfer apparatus best illustrated in FIG. 2 and FIGS. 10 and 11. It includes a stationary housing 60 fixed to a support platform 69 mounted to the inner tower 12. Housing 60 is located beneath the inner end of the innermost length of the lateral conduit 11. The housing 60 slidably receives a cylindrical sleeve 61 supported for translational movement parallel to the axis of lateral conduit 11. The central portion of cylindrical sleeve 61 has annular serrations 62 formed about its exterior, which are complementary to serrations at the lower end of a vertical plunger 63 mounted within a control solenoid 64. Plunger 63 is spring-loaded to the operative or locked position shown in FIG. 11.

The cylindrical sleeve 61 is shiftable along its axis by means of first and second rods 65, 72 which are operatively connected to it through spring biased connections that serve as lost motion mechanisms to permit this transfer unit to have a "memory" ability. The first rod 65 has a reduced diameter inner end section that is movably encircled by annular disks 66, 67 respectively abut inner shoulders 70,71 at the inner surface of sleeve 61. The second rod 72 has a reduced diameter inner end surrounded by movable annular disks 73, 74 similarly spread by compression spring 75. Disks 75, 74 respectively abut inner shoulders 76,77 on the sleeve 61. The strength of spring 75 is somewhat less than that of spring 68.

The compression springs 68,75 permit relative axial movement between rod 65, rod 72 and sleeve 61. The outer end of the first rod 65 is pivotably connected to a rigid control linkage 78 whose remaining end is pivotably connected to an intermediate portion of the upright supply conduit 23. The pivot axes at the respective ends of the control linkage 78 are in vertical alignment with the pivot axes of knuckles 25 and 26 respectively. Control linkage 78 therefore completes a parallelogram linkage including the conduit 23, the transverse supply conduit 24, and the lateral conduit 11 and wheel carriage 12 which supports it. Because of this parallelogram arrangement, transverse horizontal movement of coupler assembly 22 will be transferred to the first rod 65, and conduit 23 will at all times be supported in an upright condition.

The outer end of the second rod 72 is connected to a steering controller 80, of a type effective to modify the path of movement of the lateral conduit 11 by either steering or driving the wheels that support carriages 12, 13 and 14. This preferably comprises a variable speed controller 80 which modifies the speed of the motors driving either or both of the towers 12, 14 at the respective ends of conduit 11.

Figure 11:
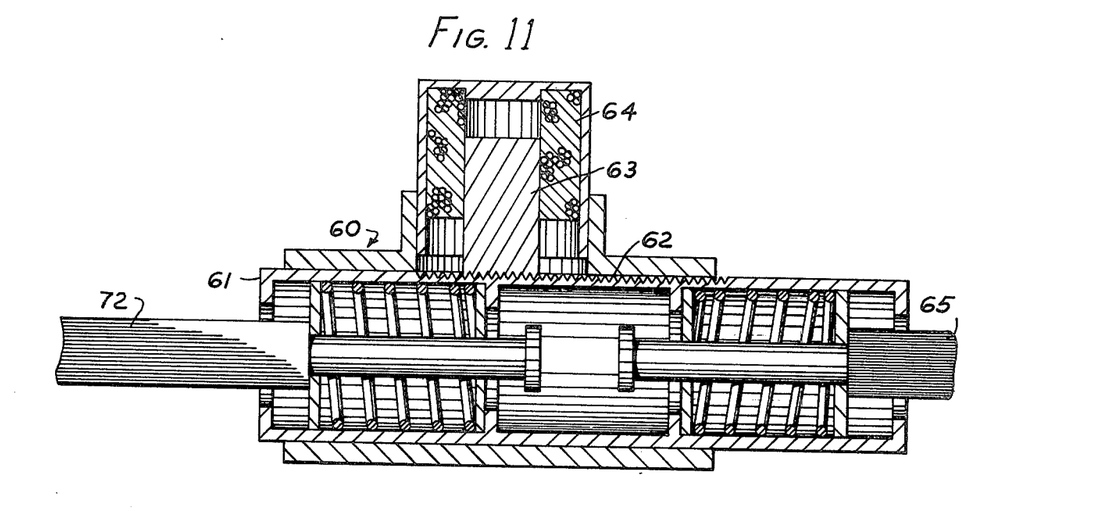
FIG. 11 is a sectional view similar to FIG. 10 only showing a different operational relationship of the elements therein.
Figure 12:
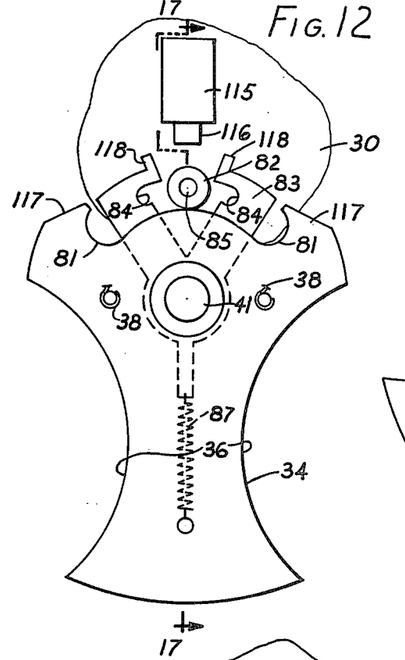
FIGS. 12-16 are enlarged fragmentary views of the locking cams in operational sequence.
Figures 13, 15:
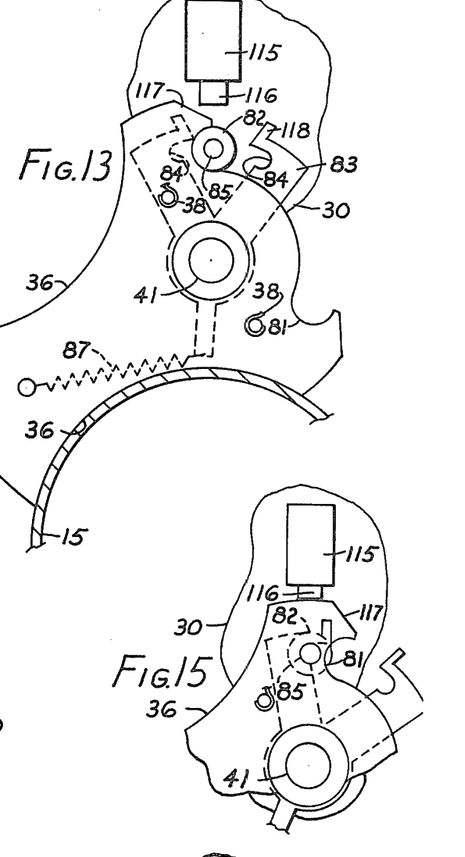
Figure 14:
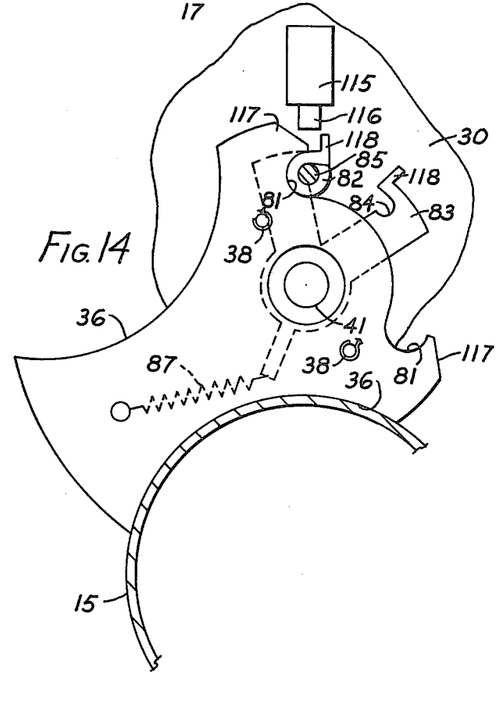
Figure 16:
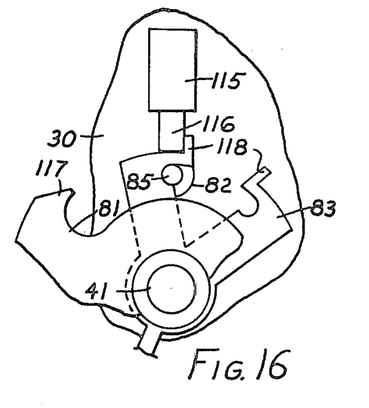

As can be seen in FIG. 11, as the coupler assembly 22 moves transversely by engagement with a riser 15, sleeve 61 remains stationary. The resulting movement of conduit 23 is transmitted to the first rod 65. This movement will compress spring 68 in one direction or the other dependent upon the direction of movement of the coupler assembly 22 with respect to the inner end of the lateral conduit 11. When solenoid 64 is subsequently energized to lift plunger 63, the stored forced in spring 68 will shift the sleeve 61 to a new equilibrium position. This shifting movement will either be transmitted at that time to the controller 80 through the second rod 72, or, if controller 80 is not in an adjustable mode, will result in loading of spring 75 (FIG. 11) for subsequent movement of second rod 72 when controller 80 can be adjusted. For instance, some types of variable speed drives such as a variable pitch pulley adjust best when the motor driving the wheeled carriage is running. In these cases, the actual modification of the controller 80 can occur subsequent to the time at which the coupler assembly 22 has been repositioned and indexed at a riser 15. The locking of cylindrical sleeve 61 by de-energizing solenoid 64 will maintain the proper spring biasing force on rod 72 to assure subsequent operation of controller 80. This memory factor permits the present apparatus to be used with a wide variety of variable speed control assemblies for steering of the equipment between spaced risers.

Movement of coupler assembly 22 may be intermittently interrupted at selected risers 15 through operation of the riser sensing and locking cams 34, 35, As shown in FIGS. 12-16 angular movement of the larger cam 34 may be mechanically controlled as it pivots about the post 41. This control is provided by an upwardly biased stop bolt 82 located between arcuately spaced shoulders 81 that project radially beyond the bolt 82 at the back side of the cam 34. The stop bolt 82 is spring-biased to a raised position where it intersects and engages the moving shoulders 81.

The upper surface of stop bolt 82 includes an axial center pin 85 of reduced diameter. The height of pin 85 is substantially equal to the thickness of a pivoted bolt lock 83 independently journalled about the axis of pivot post 41. Bolt lock 83 is movably centered on the cam 34 by a tension spring 87 connected at one end to the bolt lock 83 and at its remaining end to the underside of cam 34. Thus, as cam 34 is pivoted about post 41, spring 87 will yieldably urge the bolt lock 83 about the post axis in a similar direction of pivotal movement.

Figure 9:
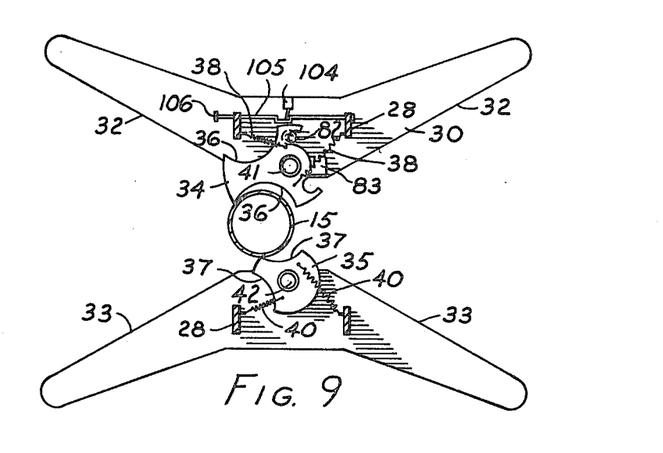

The outer arms of bolt lock 83 include two inwardly facing notches 84 designed to receive the pin 85. A vertical rod 86 fixed to the lower end of the movable conduit 44 is in axial alignment with the stop bolt 82 and pin 85. It depresses pin 85 (FIG. 6) to clear cam 34 when the projection 43 in the valve opener has been fully lowered. The bolt lock 83 is therefore permitted to overlap the upper end of stop bolt 82 and pin 85 can be received within notch 84. The operation of bolt lock 83 therefore leaves cam 34 free to pivot beyond that point at which the cam shoulder 81 engages stop bolt 82 (FIG. 9).

The apparatus further comprises several control switch assemblies and hydraulic control elements which are described with respect to the operational functions discussed below.

SUMMARY OF OPERATIONAL SEQUENCE

The present apparatus can be used to steer any form of steerable mobile apparatus along a path defined by a plurality of references spaced along the path. It is particularly useful in controlling an intermittently operable lateral conduit in a sprinkling apparatus such as that illustrated at 11 in FIG. 1. The lateral conduit might be supported by two or more power driven wheeled structures or towers 12, 13 and 14. In such an arrangement, the drive motors of the intermediate towers 13 are typically controlled by monitoring the straight line condition of the lateral conduit 11 in a manner such that the lateral conduit 11 remains in a nominally straight line at all times. Control systems for maintaining alignment of a sprinkler conduit are well known and in general usage in both moving lateral systems and center pivot systems.

Steering of the lateral conduit to maintain it normally perpendicular to the main water supply line 16 is accomplished by controlling the speed of one of the end wheeled towers with respect to the other. For instance, the lateral conduit 11 can be turned to move toward the line 16 by increasing the speed of the outer wheeled tower 14, while maintaining the speed of wheeled tower 12 constant. Similarly, conduit 11 can be shifted away from line 16 by slowing down the outer wheeled tower 14. The intermediate portions of conduit 11 are maintained in line between the controlled end towers.

In the illustrated example, the field is intermittently sprinkled while the lateral conduit 11 is at rest. However, sprinkling can be accomplished while moving the lateral conduit 11, which then requires some type of flexible or extensible connection between the risers 15 and lateral conduit 11.

In an intermittent system, when the field has been sufficiently watered, a sprinkling timer might be used to energize the motor 52. Rotation of motor 52 is transmitted to the threaded shaft 50 to cause movable conduit 44 to be raised within upright supply conduit 23.

As the movable conduit 44 raises, the projection 43 of the valve opener allows ball 21 to shut off the water flowing through the top aperture 20 in the spherical upper end 18 of riser 15.

As the movable conduit 44 is raised, the rod 86 is lifted from the stop bolt 82, freeing cam 34 for pivotal movement. The spring-centered bolt lock 83 prevents the stop bolt 82 from relocking cam 34.

When movable conduit 44 is completely retracted, it engages the circular flange 51 within upright supply conduit 23, mechanically preventing further axial movement of conduit 44. As the drive shaft 53 of motor 52 continues to rotate, it works against spring 55 and lowers flange 54 until it actuates the lower control switch 59. Switch 59 may then open the circuit to motor 52, terminating rotation of drive shaft 53.

Opening of switch 59 might activate a drain timer. When a sufficient delay has occurred to insure that the lateral conduit 11 has drained, a power circuit is completed to the drive motor or motors 94 on the end towers 12, 14. This will cause the lateral conduit to travel to the next riser. As the riser 15 clears cams 34, 35, they will return to a neutral position due to the centering action of springs 38, 40. The spring-centered bolt lock 83 releases stop bolt 82, which is then free to move upwardly to its interfering position between the cam shoulders 81 on cam 34.

As the coupler assembly 22 approaches the next riser 15, the guide plates 30, 31 and cams 34, 35 progressively engage the cylindrical surfaces of the riser 15 and center the coupler assembly 22 about it by pivoting the upright supply conduit 23 about the axis of knuckle 26. If the lateral conduit 11 has drifted toward the riser 15 being approached, the coupler assembly 22 will be shifted to the left as seen in FIG. 2. This movement will also be transmitted through the control linkage 78 to the first rod 65 within cylindrical sleeve 61 of the control transfer apparatus. This will force spring 68 inwardly against the shoulder 70, held stationary by the solenoid plunger 63 which engages the sleeve serrations 62. If the lateral conduit 11 has drifted away from riser 15, the rod 65 would be pulled outwardly and would force spring 68 against the shoulder 71 within sleeve 61.

Figure 8:
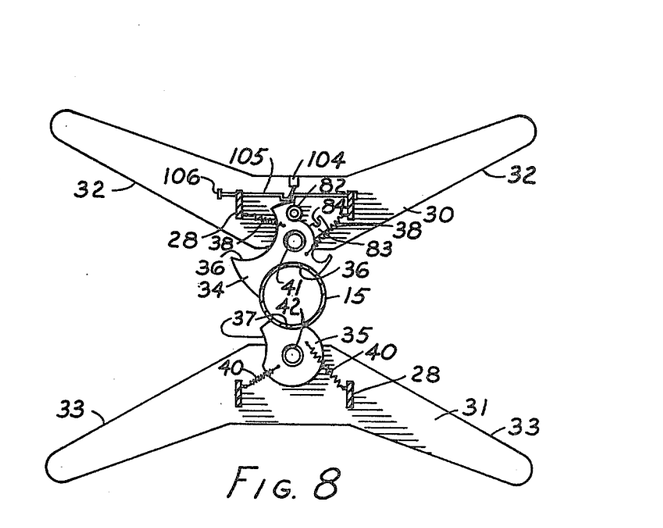

When the coupler assembly 22 is properly positioned and indexed about riser 15, cam 34 will have rotated about pivot post 41 to a position where cam shoulder 81 abuts the stop bolt 82 (FIG. 8). This provides a mechanical interlock to prevent further travel of the coupler assembly 22 with respect to the riser 15. At this time, the rotation of cam 34 causes cam 95 at the lower end of pivot post 41 to operate a switch 96 which disables the drive motors 94 on the towers 12, 14 through suitable control circuitry. At the same time, operation of switch 96 also energizes motor 52 to cause shaft 50 to move the conduit 44 downward within the upright supply conduit 23.

As conduit 44 reaches the spherical upper end 18 of riser 15, its continued downward movement raises the cams 34, 35 upwardly against the spherical bottom portions of the enlargement on riser 15. This upward movement is permitted by pivotal movement at the knuckles 25, 26 at the respective ends of the transverse supply conduit 24. Continued relative movement between the movable conduit 44 and the remainder of the coupler assembly 22 causes the projection 43 to depress the ball 21 within the riser 15 and allow water to flow from the riser up, through the supply conduits 23, 24 to the lateral conduit 11. The sprinkling timer, which has then been reset, will permit such sprinkling to occur for a predetermined period before recycling the system.

As the movable conduit 44 completes the opening of the riser valve, the rod 86 depesses stop bolt 82 and closes a permissive travel switch 102 and opens a switch 103. As motor 52 continues to turn, the threaded shaft 50 will cause the flange 54 to operate switch 58, terminating operation of motor 52. This overtravel, detected through means of flange 54, insures a complete tight closure between riser 15 and the lower end of the movable conduit 44. Water pressure in the lateral conduit 11 or the closing action of the movable conduit 44 starts the irrigation timer and completes a cycle of operation.

At the same time that motor 52 was activated to complete a hydraulic circuit through the riser 15 to the lateral conduit 11, solenoid 64 is also energized, lifting plunger 63 from contact with sleeve 61 and allowing the compressed spring 68 to shift sleeve 61 with respect to housing 60. This either compresses the weaker spring 75 or shifts the second rod 72. Rod 72 in turn operates controller 80 for the motor drive at either of the end towers 12 or 14. The amount of steering correction is therefore detected while the coupler assembly 22 is indexed at a riser 15, but may be utilized subsequently during travel of the sprinkling apparatus 10 to bring the coupler assembly 22 to the next riser in the row.

Steering of the lateral conduit 11 is accomplished by setting one end tower (preferably the outer tower 14) to operate at a constant speed while traveling. If a second tower, (preferably the inner tower 12) is set to travel at the same speed, the lateral conduit 11 will move in a straight line. If, however, tower 12 travels faster than tower 14, tower 12 will pivot forwardly about tower 14 as lateral conduit 11 is moved forward. This will turn the lateral conduit 11 in a direction away from the row of risers 15. Conversely, if tower 12 travels at a slower rate than tower 14, lateral conduit 11 will be shifted or steered toward the row of risers 15. The amount of correction will be directly proportional to the amount of movement imparted to the second rod 72 and controller 80 each time that the coupler assembly 22 is indexed at a riser 15. This correction will tend to steer the lateral conduit 11 toward or away from the line of risers 15 and will correct for end drift due to field surface variations.

Within the physical limits of the guide plates 30, 31 an irregular or curved row of risers 12 will also be followed automatically by coupler assembly 22 and the sprinkling apparatus 10. Since correction of the steering mechanism is made at every riser 15 and is in direct proportion to the amount needed, the system will be fine tuned for best tracking of the risers at all times and has the capability to follow a crooked or curving row of risers within the physical limits of the spread across guide plates 30, 31 and their converging guide surfaces 32, 33. It is preferable that there be some timed circuit in the electrical controls for the drive motors on the towers 12, 13 and 14 to shut down the drive system if the coupler assembly controls are not cycled within time sufficiently adequate for the system to span a successive pair of risers 15.

Riser Skip and Reversing Controls

The motor control circuit for the towers 12, 13 and 14 is designed so that when the polarity of the direct current control signal supplied to it is reversed, the direction of rotation of the drive motors on the towers is also reversed. The double pole, double throw toggle switch 104, (FIG. 9) is used for this function, switch 104 having a center position in which its circuits are open and which therefore disables the drive motors on the towers 12, 13 and 14. Switch 104 is operated through a slidable rod 105 mounted by bearings in the arched frames 28. Disks 106 at the respective ends of rod 105 serve as operating bottons to shift rod 105 with respect to the coupler assembly 22.

Figures 17, 18:
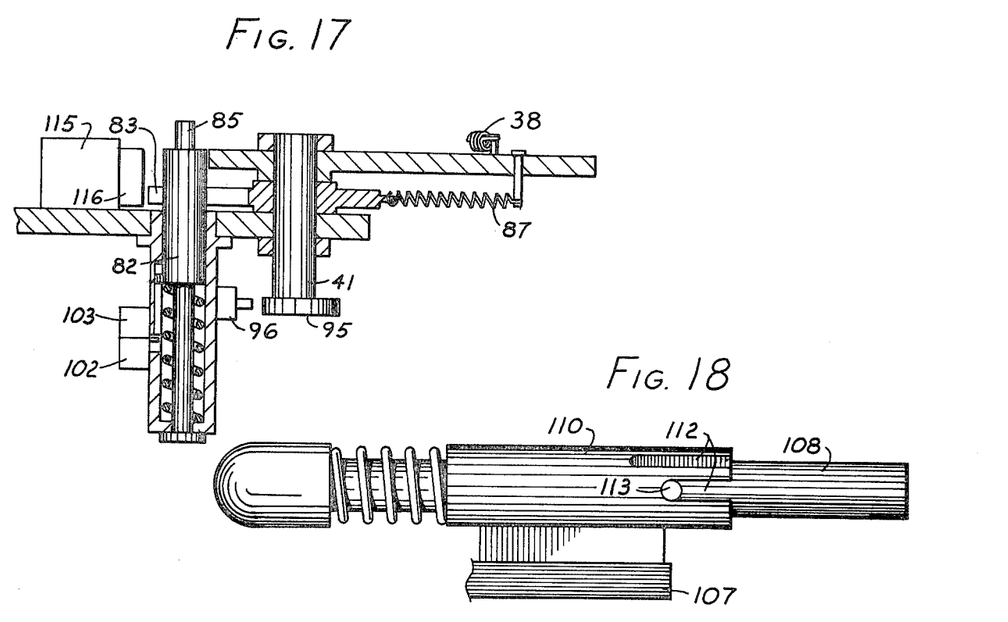
FIG. 17 is an enlarged sectional view taken along line 17—17 in FIG. 12.
FIG. 18 is an enlarged fragmentary view of a stop control bolt assembly.
Figures 19, 20:
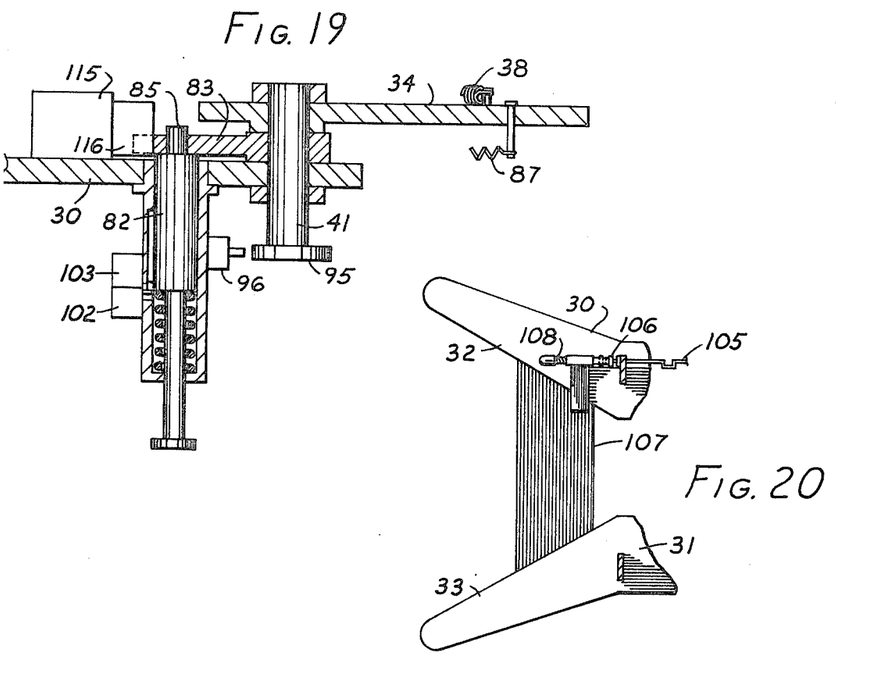
FIG. 19 is a view similar to FIG. 17 only showing different operational positions of the elements therein.
FIG. 20 is a plan view of a stop mechanism.

Rod 105 is activated at a stationary stop 107. Stop 107 (FIG. 18,20) is stationary and located in line with the row of risers 15 at a sufficient distance beyond the last riser so that cams 34, 35 will clear the last riser 15 and return to their normal positions before guide plates 30,31 contact the stop 107. Stop 107 is at the proper elevation to intersect the moving path of the guide plates 30,31 which permits the converging surfaces 32, 33 to shift the coupler assembly 22 so as to center on the stop 107 in the same manner by which the coupler assembly 22 is indexed to an individual riser 15.

Stop 107 supports a spring-loaded bolt 108 pivotably mounted through a sleeve 110 aligned elevationally with the disks 106. Sleeve 110 is notched at 112 to receive radial pins 113 which project in diametrically opposite directions across the bolt 108. The notches 112 are slightly offset along the axis of bolt 108, so that contact of a disk 106 by the bolt 108 will either shift the rod 105 from one extreme position to the other or will shift it to a center position, depending upon which of the notches 112 contains the pins 113. In other words, the length of bolt 108 can be effectively modified by turning it about its axis to bring the pins 113 into alignment, with one or the other of the notches 112. The effective length of bolt 108 will in turn control the resulting movement imparted to rod 105 due to continued movement of the coupler assembly 22 relative to stop 107. This will result in the sprinkling apparatus either being reversed in direction, or stopped entirely.

One of the stops 107 would normally be placed at each end of the row of risers 15. By locating the stop and reverse controls on a separate unit physically outward from the last riser instead of on one of the risers, one can assure that the field is more evenly sprinkled. If one is watering the field from every riser 15, the lateral conduit 11 will travel beyond the final riser and will return to it and again water at this same setting. In this way, each setting of the sprinkling apparatus, including the end settings at the final risers 15, will obtain the same amount of water. Were the reverse control to be on the last riser, the setting at that riser would receive only half as much water as the settings at the intermediate risers. When using a system of skipping alternate risers as described below, the proper skip sequence is always maintained by moving the lateral conduit 11 beyond the final riser 15. This will be assured regardless of whether the field contains an even or odd number of risers 15.

Riser Skip Mechanism

In some cases it is desirable to irrigate from every other riser 15 as the lateral conduit 11 progresses back and forth across the field to be irrigated. The advantage to this method is that the watering time cycle is uniform. Since the infiltration rate of soil is greatest when the soil is driest, more water can be applied without runoff because the lateral conduit 11 will always travel to a dry area in the field at the beginning of each watering cycle. When watering a field at every riser location, about half of the field area being sprinkled is dry and the other half is normally wet. In a continuously moving system such as is used in a center pivot sprinkling system, only the leading edge of the field area being sprinkled is dry. With a higher application rate for sprinkling, more acres can be watered with a given system, resulting in a lower capital investment per acre.

A preferred riser skip mechanism is shown in FIGS. 12–16. It comprises a mechanical device 115 fixed to the upper surface of guideplate 30 and centered across from the pivot posts 41, 42. This device includes an operator 116 which can be depressed by pushing it inward. The mechanism within the device is of a type common to pushbutton electrical switches or ballpoint pens, wherein the operator is depressed once to lock it in the depressed position. It then remains in the depressed position until it is further depressed, which releases it for extension outward of the device 115.

The operator 116 serves as a latching mechanism to control the stop bolt 82 and to permit the cams 34, 35 to pass by every other riser 15 without stopping the sprinkling apparatus 10. Furthermore, so long as stop bolt 82 is depressed, the switch 102 will remain closed and supply power to the drive motors of the towers 12, 13 and 14 as the coupler assembly 22 passes over a riser 15. In addition, the switch 103 will remain open to prevent the motor 52 from operating to move conduit 44 downwardly about the riser 15.

The operator 116 is depressed by outer cam surfaces 17 formed on the cam 34 beyond the shoulders 81. The operator 116 engages behind lugs 118 which project outward from the bolt lock 83. With the operator 116 initially depressed, the engagement of a riser 15 by the cams 34, 35 will activate the sprinkling system as described above, bringing one of the cam shoulders 81 into engagement with stop bolt 82. The stop bolt 82 will be subsequently depressed by rod 86 and will be overlapped by the bolt lock 83, bringing pin 85 within notch 84.

After the sprinkling cycle has been completed, movement of the sprinkling apparatus will cause the cam 34 to bring surface 117 into contact with operator 116, depressing operator 116 and causing it to project outwardly from the device 115. As the cam 34 is subsequently centered by spring 38, cam surface 117 will clear the operator 116, which will then project outwardly and be engaged behind the lug 118 of the bolt lock 83, (FIG. 16) which follows pivotal movement of cam 34. Thus, the bolt lock 83 will prevent stop bolt 82 from protruding upwardly as normal.

As the cam 34 engages the subsequent riser, the cam shoulders 81 will move freely over the recessed stop bolt 82. Again, the cam surface 117 will depress operator 116, causing the operator 116 to remain depressed, and permitting bolt lock 83 to clear stop bolt 82 in the normal manner and prepare the apparatus to mechanically interlock when the next riser 15 is encountered. This procedure will alternate at each riser 15.

Various modifications might be made in this apparatus without deviating from the general structural and functional relationships described above. For this reason, only the following claims are intended to define the invention set out herein.

To summarize, the described apparatus relates to a steerable wheel supported sprinkling system that is powered for movement along a field. The sprinkling apparatus is designed to travel along the path defined by the risers which are hydraulically coupled to a main water supply line. While guidance along a series of spaced risers is preferable, it eliminates the need for any secondary references being placed along the field, this disclosure is not to be limited to guidance along risers only. It is to be understood that other forms of spaced references, such as stationary posts, stakes, etc. may be used in place of the risers as the references arranged along the desired path of the sprinkling apparatus. For instance, such posts would most likely be used in instances where the sprinkling apparatus is connected to a source of water by means of a flexible hose, or is supplied with water from an open ditch in the field.

It is also to be understood that this apparatus can be used for steering a sprinkling system that is moved continuously or intermittently, and can be used to steer a sprinkling system that distributes water onto the field either continuously or intermittently. In either instance, the steering of the sprinkling apparatus will be set by sensing of a spaced reference, and the sprinkling apparatus will move from one reference to the next without intermediate guidance.

When used in conjunction with water supply risers as the steering references, the sprinkling apparatus can be guided by sensing means in the form of a valve coupler, as illustrated, or by independent sensing means, such as movable switches, lever arms, or other devices capable of engaging the risers and sensing the position of each engaged riser with respect to the sprinkling apparatus. The valve coupler can be independently supported on a wheeled carriage, or suspended along any portion of the sprinkling apparatus. It can be mechanically interconnected to the sprinkling apparatus, as illustrated, or can be flexibly interconnected by means of a length of hose or flexible conduit which would thereby permit independent movement of both the coupler and the sprinkling apparatus relative to one another. Again, these choices will be dictated largely by the mode of operation of the sprinkling apparatus; a flexible interconnection being necessary in those instances where the sprinkling apparatus is continuously moving or is applying water to the field while moving.

Having described my invention, I claim:

1. The method of guiding a steerable mobile sprinkling apparatus along a path parallel to a predetermined pattern of water outlets spaced from one another along a main water supply line which consists in:
having the sprinkling apparatus move along the path;
transversely centering a coupling element with respect to each water outlet encountered by the sprinkling apparatus;
sensing the amount of transverse movement necessary to center the coupling element; and
steering the sprinkling apparatus in relation to such transverse movement to thereby direct the sprinkling apparatus to the subsequent water outlet in said pattern without any guidance between water outlets.

2. In a steerable sprinkling apparatus powered for movement along a plurality of stationary water outlets arranged along a field in hydraulic communication with a main water supply line, wherein each water outlet includes a controllable valve for delivery of water;
an apparatus for steering the sprinkling system without any guidance between water outlets, comprising:
fluid connection means having first and second ends, said first end being mounted to the sprinkling apparatus in hydraulic communication therewith;
valve coupler means mounted to said second end of the fluid connection means for selectively completing a hydraulic circuit between a water outlet valve and the sprinkling apparatus;
guide means for centering the valve coupler means with respect to each water outlet valve by moving the valve coupler in a direction transverse to the intended path of the sprinkling apparatus along the water outlets;
and steering means operatively connected to said valve coupler means and to said steerable sprinkling apparatus for sensing transverse movement of said valve coupler means and modifying the path of movement of the sprinkling apparatus along the field in relation to such transverse movement.

3. The apparatus set out in claim 2 wherein said fluid connection means comprises:
rigid conduit movably suspended from the sprinkling apparatus for motion in a vertical plane perpendicular to the intended path of the sprinkling apparatus along the water outlets, said conduit having one end operatively connected to the sprinkling apparatus and a second end operatively connected to said valve coupler means.

4. The apparatus as set out in claim 3 wherein said one end of the conduit is connected to the sprinkling apparatus about a horizontal pivot axis.

5. The apparatus as set out in claim 4 wherein said steering means comprises:
a mechanical linkage connected between said conduit and said sprinkling apparatus, said mechanical linkage including an element movable in response to pivotal motion of the conduit about said horizontal pivotal axis.

6. The apparatus as set out in claim 2 wherein said steering means is operable while a hydraulic circuit is complete between a water outlet valve and the sprinkling apparatus through said valve coupler means.

7. In a movable linear sprinkling system of the type having an elongated lateral pipeline assembly including a sprinkler conduit which is wheel-supported, said lateral pipeline assembly being powered for movement perpendicular to its length, a plurality of stationary risers arranged along a field in hydraulic communication with a main water supply line, each riser including an individually controllable valve for delivery of water;
a coupler;
structural fluid connection means having a first end mounted to the lateral pipeline in hydraulic communication therewith, and a second end mounted to the coupler, said structural fluid connection means being adapted for moving the coupler between risers in unison with the lateral pipeline;
valve operating means on said coupler at said second end of the structural fluid connection means for selectively completing a hydraulic circuit between a riser valve and the lateral pipeline;

guide means on said coupler engageable with a riser for indexing the position of the second end of said structural fluid connection means relative to the riser engaged thereby;

and steering means operably connected between the coupler and the lateral pipeline for sensing the approach path of the coupler at each riser and for modifying such path during movement to the next riser to guide the coupler from one riser to the next without any intermediate guiding reference while the coupler is moving.

8. The apparatus set out in claim 7 wherein said structural fluid connection means comprises:

a supply conduit having an inner end in hydraulic communication with the sprinkler conduit and an outer end, said coupler being fixed to said outer end;

support means suspending the weight of the supply conduit from said lateral pipeline assembly for permitting motion of its outer end and said coupler within a vertical plane parallel to the length of the lateral pipeline assembly;

said steering means being responsive to horizontal motion of said coupler within said vertical plane.

9. The apparatus as set out in claim 8 wherein the supply conduit is rigid, and further comprising:

pivotal support means connected between the inner end of the supply conduit and the lateral pipeline assembly for mounting the supply conduit about a horizontal axis perpendicular to the length of the lateral pipeline.

10. The apparatus as set out in claim 8 wherein the supply conduit is rigid, and further comprising:

pivotal support means connected between the inner end of the supply conduit and the lateral pipeline assembly for mounting the supply conduit about a horizontal axis perpendicular to the length of the lateral pipeline;

and stop means for limiting downward motion of said supply conduit about said horizontal axis to a condition at which the coupler is located at a predetermined elevation relative to the lateral pipeline.

11. The apparatus as set out in claim 8 wherein said valve operating means comprises:

movable sealing means mounted at the outer end of said supply conduit;

and power-operated means on said supply conduit for moving the sealing means axially with respect to the outer end of the supply conduit; and an overtravel mechanism operatively interposed between said sealing means and said power-operated means for permitting continued operation of the power operated means for a predetermined period following physical stoppage of axial movement of the sealing means by its engagement against a riser.

12. The apparatus as set out in claim 7 wherein said steering means operably controls the path of movement of the lateral pipeline assembly along the field.

13. The apparatus as set out in claim 7 wherein said steering means is operable while a hydraulic circuit is complete between a riser valve and the lateral sprinkling apparatus through said valve operating means.

14. A method of guiding a steerable mobile sprinkling apparatus along a path in a direction parallel to a plurality of spaced references, comprising the following steps:

transversely indexing the mobile sprinkling apparatus relative to each reference encountered along the path;

sensing the transverse distance between each encountered reference and a selected location on the mobile sprinkling apparatus when the mobile sprinkling apparatus is transversely indexed relative to it;

and steering the mobile sprinkling apparatus by a preset correction proportional to the sensed transverse distance to direct it toward or away from a path defined by the spaced references during subsequent movement of the mobile sprinkling apparatus between each encountered reference and the succeeding reference.

15. In a steerable sprinkling apparatus powered for movement across a field along a path in a direction parallel to a plurality of spaced references.

indexing means on the sprinkling apparatus for detecting each reference encountered along its path and for transversely locating the sprinkling apparatus relative to each encountered reference;

sensing means on the sprinkling apparatus for determining the transverse distance between each encountered reference and a selected location on the sprinkling apparatus when the sprinkling apparatus is transversely located relative to it;

steering means on the sprinkling apparatus for directing it along a preset course as it moves between each encountered reference and the succeeding reference;

and means operatively connected to said sensing means and said steering means for modifying the steering means in response to the transverse distance determined by the sensing means at each encountered reference to direct the mobile apparatus toward or away from a path defined by the spaced references as the sprinkling apparatus subsequently moves between the encountered reference and the succeeding reference, the amount of such modification being in direct proportion to the determined transverse distance at each encountered reference.

16. The apparatus as set out in claim 15 wherein the spaced references comprise a plurality of upright risers in communication with a main water supply line.

17. The apparatus as set out in claim 15 wherein the spaced references comprise a plurality of upright risers in communication with a main water supply line, said sensing means comprising:

fluid connection means mounted to the sprinkling apparatus in hydraulic communication therewith for selectively supplying water from a riser to the sprinkling apparatus.

18. The apparatus as set out in claim 15 wherein the spaced references comprise a plurality of upright risers in communication with a main water supply line, and wherein each riser includes a controllable valve for delivery of water; said sensing means comprising:

fluid connection means having first and second ends, said first end being mounted to the sprinkling apparatus in hydraulic communication therewith;

and valve coupler means mounted to said second end of the fluid connection means for selectively completing a hydraulic circuit between a riser valve and the sprinkling apparatus.

* * * * *